Feb. 21, 1939.   R. F. MALLINA   2,147,710
CALL TRANSMITTER
Filed June 12, 1937   7 Sheets-Sheet 1

INVENTOR
R. F. MALLINA
BY J. MacDonald
ATTORNEY

Feb. 21, 1939. R. F. MALLINA 2,147,710
CALL TRANSMITTER
Filed June 12, 1937   7 Sheets-Sheet 2

INVENTOR
R. F. MALLINA
BY J. MacDonald
ATTORNEY

Feb. 21, 1939. R. F. MALLINA 2,147,710
CALL TRANSMITTER
Filed June 12, 1937 7 Sheets-Sheet 3

INVENTOR
R. F. MALLINA
BY J. MacDonald
ATTORNEY

Feb. 21, 1939.  R. F. MALLINA  2,147,710
CALL TRANSMITTER
Filed June 12, 1937  7 Sheets-Sheet 4

INVENTOR
R. F. MALLINA
BY J. MacDonald
ATTORNEY

Feb. 21, 1939.  R. F. MALLINA  2,147,710
CALL TRANSMITTER
Filed June 12, 1937  7 Sheets-Sheet 5

INVENTOR
R. F. MALLINA
BY J. MacDonald
ATTORNEY

Feb. 21, 1939.　　　R. F. MALLINA　　　2,147,710
CALL TRANSMITTER
Filed June 12, 1937　　　7 Sheets-Sheet 7

INVENTOR
R. F. MALLINA
BY J. MacDonald
ATTORNEY

Patented Feb. 21, 1939

2,147,710

UNITED STATES PATENT OFFICE 2,147,710

CALL TRANSMITTER

Rudolph F. Mallina, New York, N. Y., assignor to Bell Telephone Laboratories, Incorporated, New York, N. Y., a corporation of New York Application June 12, 1937, Serial No. 147,911

3 Claims. (Cl. 179—90)

This invention relates to call transmitters of the type used in automatic telephone systems for controlling the operation of switches for establishing talking connections.

The object of the invention is to provide a call transmitter of the type above referred to which will be simple to operate, positive in operation, and which will effect a material reduction in the time for transmitting any given telephone call designation, as compared to call transmitters now in use.

According to the invention, a set of manually operable key members numbered to represent digits is provided for operating either singly or in combination a number of vibrating reeds in the coil of an electromagnetic device connected to the telephone line. These reeds form part of the electromagnetic device and are tuned to different frequencies for generating alternating currents of these frequencies in the telephone line to which the coil is connected and thereby energizing electrical filter devices placed at the exchange for selectively operating electromagnets which in turn control the operation of associated switches for establishing telephone connections corresponding to the digit key members which have been operated.

More specifically, a mounting plate or base is provided for securing supporting means for a shaft used for pivotally mounting a plurality of lever members disposed for operation either singly or in combination by the manual operation of a set of digit keys. Means carried by the lever members is provided for vibrating the reeds in the coil of an electromagnetic device and adjacent the pole-pieces of a permanent magnet for generating alternating current signals in the telephone line, there being ten signals effected by the operation of such reeds. Means is provided for yieldably holding the lever members in operative relation with their associated digit keys, which are held in the non-operated or normal position by spring means abutting against a guiding plate for the keys and the undersides of the key buttons. Adjustable means is provided for controlling the amplitudes of the vibrating reeds as to generate the required voltage value of the signals in the telephone line for operating selective magnets through electrical filter devices at the telephone exchange, the operation of such magnets being dependent upon the tune frequencies of the reeds, while means in the base plate is provided for receiving a casing for housing the operating mechanism of the transmitter and to serve as a cradle for a telephone handset.

Other features and advantages of the invention will appear from the following description and by the claims appended thereto, reference being had to the accompanying drawings in which—

Figure 1:
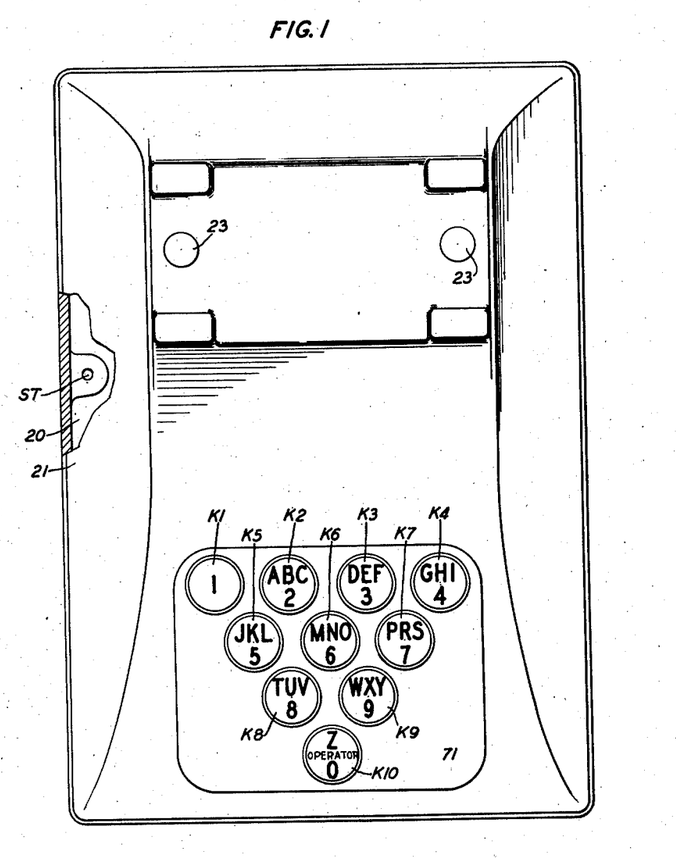
Fig. 1 is a top assembly view.
Figure 12:
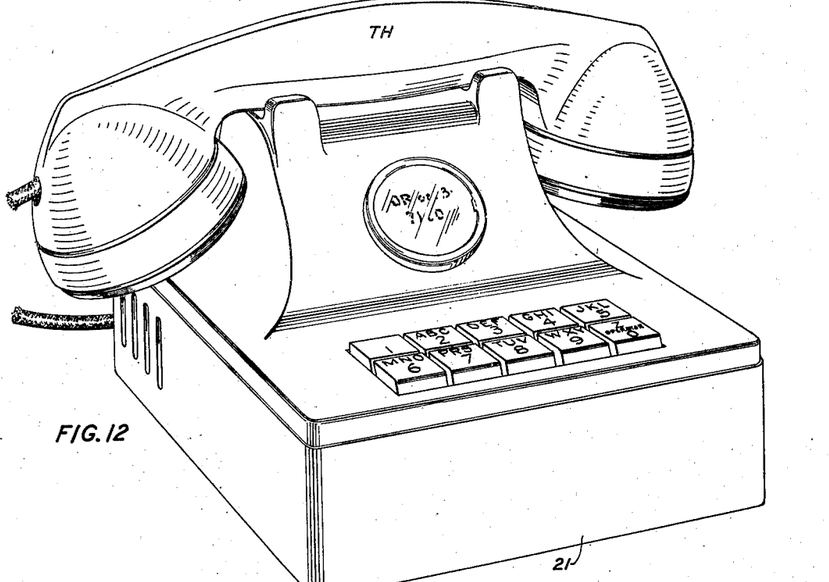
Fig. 12 is a perspective view of a modification of the call transmitter.
Figure 14:
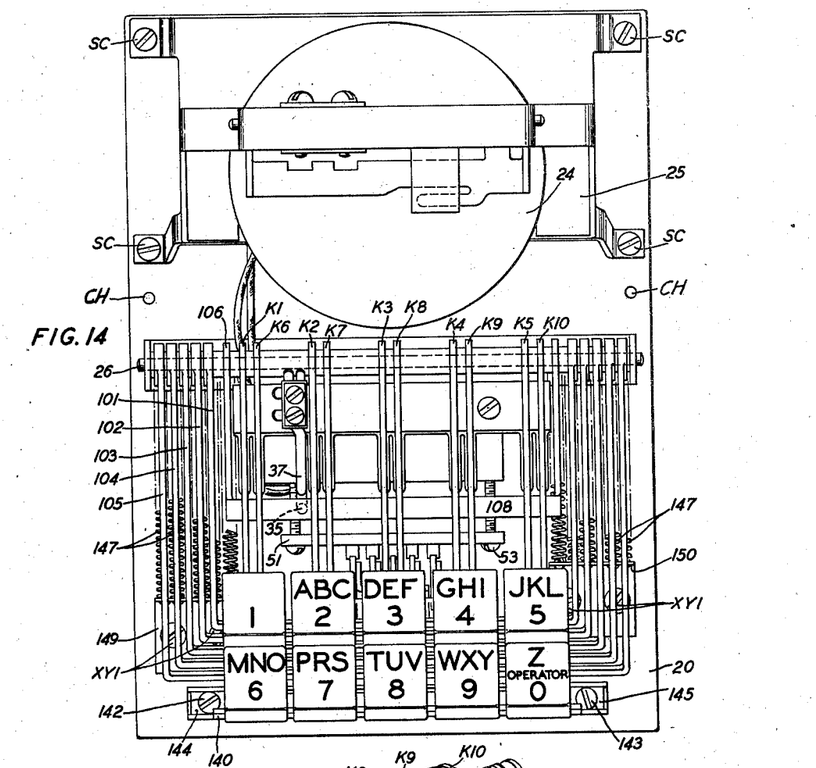
Fig. 14 is a top assembly view shown with the casing removed.

In the call transmitter of the invention, as shown in Figs. 1, 2, 3 and 4, the base plate 20 cooperates with the casing 21 to form a housing for the call transmitter mechanism and a cradle for the telephone handset TH, shown in Fig. 12, the casing 21 being secured to the base 20 by a plurality of screws passing through clearance holes CH in the plate 20 shown in Fig. 14 for engaging screw-threaded holes ST in the casing portion 21 as shown in Fig. 1.

Figure 2:
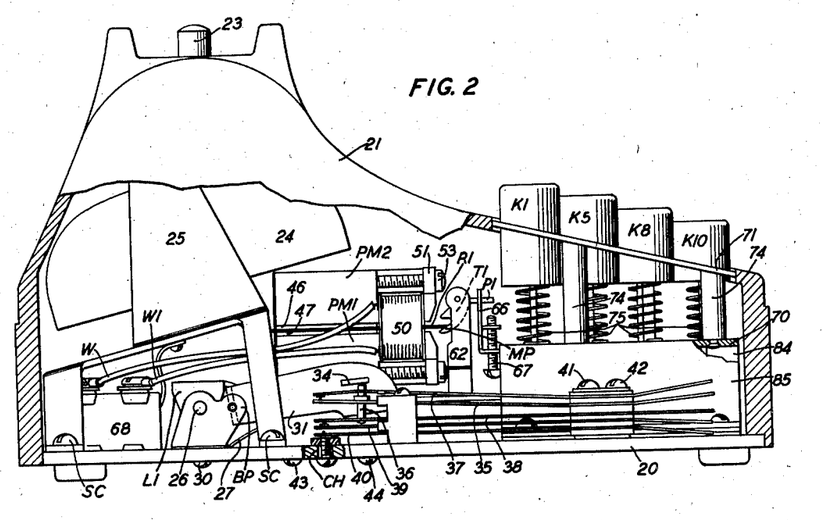
Fig. 2 is a side view thereof shown with portions of the casing cut away.
Figure 3:
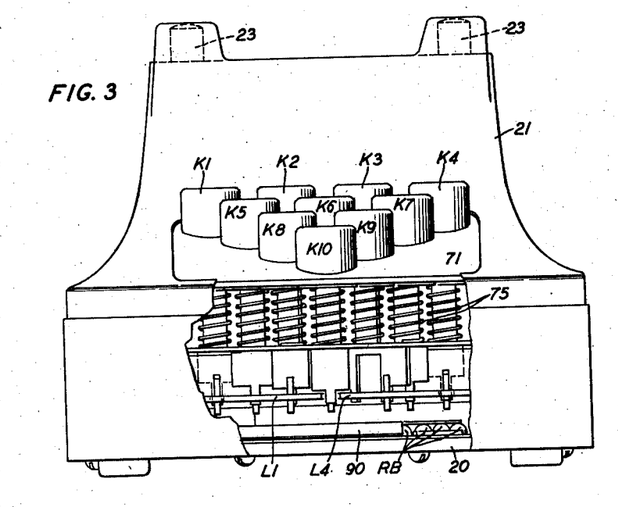
Fig. 3 is a front view shown with portions of the casing cut away.
Figure 13:
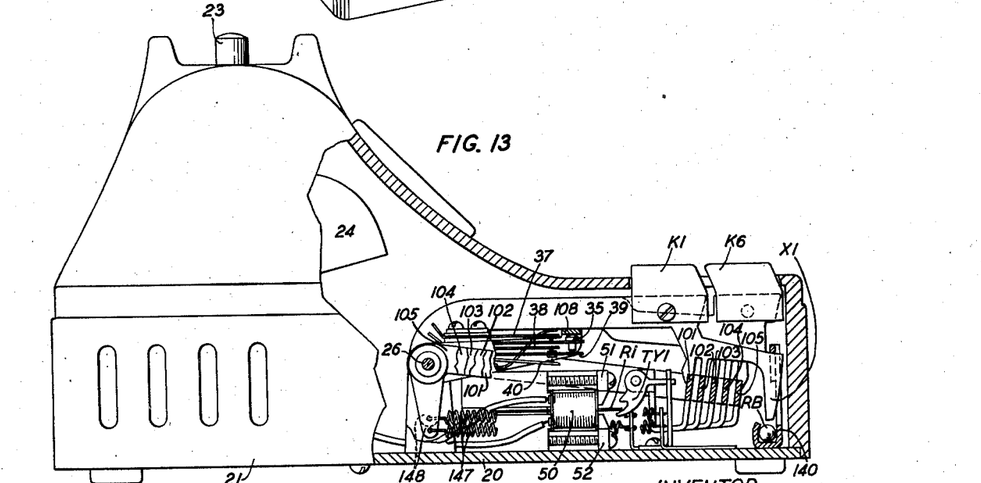
Fig. 13 is a side view thereof showing the casing with portions cut away.

On the base plate 20 is mounted ordinary switchhook springs (not shown) for operation by plungers 23 shown in Figs. 1, 2 and 3, upon the placing of the handset TH in the cradle portion of the casing 21, and a ringer device 24, shown in Figs. 2, 13 and 14, is mounted on a supporting frame 25 in turn secured to the plate 20 by a number of screws SC.

On plate 20, in position adjacent the ringer supporting frame 25 is securely mounted a cross-bar 29 having its two ends bent at right angles for supporting a shaft 26 and on this shaft is pivotally mounted a set of lever members L1, L2, L3, L4, shown in Figs. 2, 4, 5 and 7. These levers are held in normal unoperated position against the edge of a cross-bar 28 by respective ribbon springs, such as 27, having one of their ends clamped between the base plate 20 and the cross-bar 29, this cross-bar being secured to the plate 20 by a number of screws 30.

The end portions of cross-bar 29 are provided with bearing portions BP for pivotally mounting the arms 31 and 32 of a bar 33 normally held in operative relation with the lever members L1, L2, L3 and L4, through a lug 34 carried by arm 31 of this bar and resting on a stud 36 of insulating material carried by a switching spring 35, so that the operation of any one of lever members L1, L2, L3 and L4 is effective to operate the switch spring 35 for opening the contact between this spring and spring 37 and operating the switch spring 39 through the engagement of stud 36 with this switch spring for disengaging it from switch spring 38, and thereby closing the contact between the switch spring 39 and switch spring 40 provided for short circuiting the telephone receiver during the transmitting of the call designation.

The switch springs 37, 35, 38, 39 and 40 are mounted in a pile-up arrangement on the plate 20 and are securely held in adjusted position thereon by screws 41 and 42.

Figure 4:
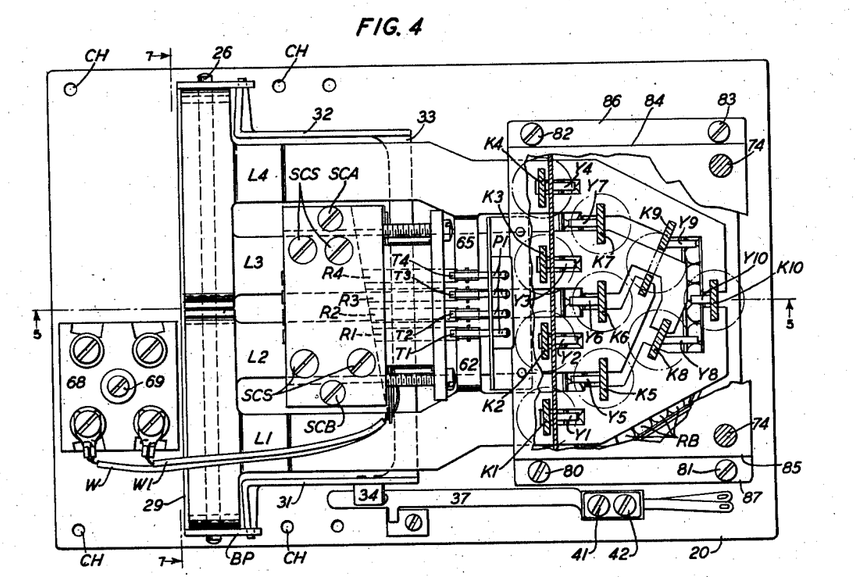
Fig. 4 is a top assembly view shown with the casing removed from the base and with a number of operating parts in section.
Figure 4A:
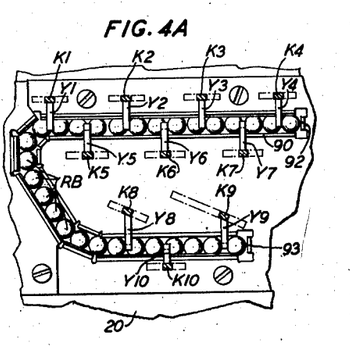
Fig. 4A is a top view of a mechanism used for preventing the operation of two digit keys simultaneously.
Figures 5, 6:
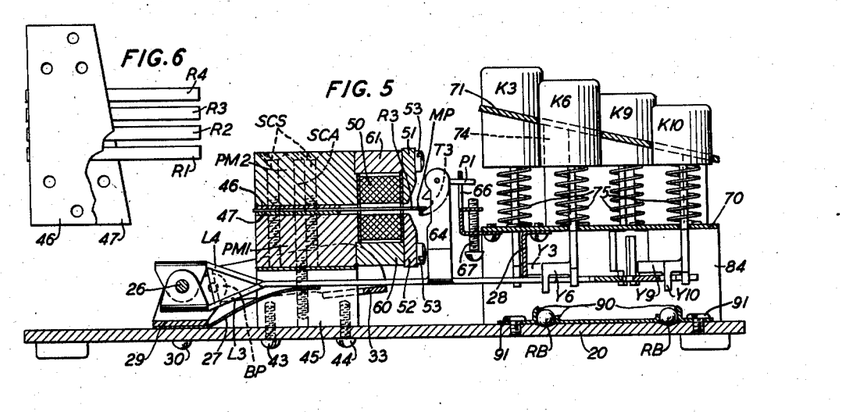
Fig. 5 is a longitudinal sectional view taken on line 5—5 of Fig. 4.
Figs. 6 and 6A are detail views.

On the base plate 20 is mounted an inverted U-shaped support 45 straddling the lever members L2 and L3, as shown in Figs. 4 and 5. This support is held securely on the base plate 20 by screws 43 and 44 and on this support are mounted in superposed relation to each other, the rectangularly-shaped permanent magnets PM1 and PM2 between which the vibrating reeds R1, R2, R3 and R4, shown in Fig. 6, and the plates 46 and 47 are clamped by screws SCS while the magnets and reed assembly thus formed is held on the support 45 by screws SCA and SCB, the plates 46 and 47 having their front edges formed diagonally to clamp different lengths of the reeds in order to obtain different vibrating rates.

Reeds R1, R2, R3 and R4 extend through an oblong-shaped opening of a coil 50 for movement adjacent the pole-pieces 51 and 52 which serve, in cooperation with the screws 53 and spacer members 60 and 61 of magnetic material, for clamping the coil 50 on the front faces of magnets PM1 and PM2, as shown in Figs. 2, 4 and 5, the ends of the coil wire, W, W1 being secured to a terminal bank 68 secured to the plate 20 by a screw 69.

The free ends of reeds R1, R2, R3 and R4 are disposed in engageable relation with respective trigger members T1, T2, T3 and T4 pivoted at the ends of upwardly extending lug portions 62, 63, 64 and 65 formed with levers L1, L2, L3 and L4, respectively. Triggers T1, T2, T3 and T4 are each provided with a projection as P1, which, in cooperation with an adjustable screw 67, controls the disengagement of the trigger members T1, T2, T3 and T4 with their respective reeds R1, R2, R3 and R4 upon the downward movement of levers L1, L2, L3, and L4 as effected by the operation of the key members K1, K2, K3, K4, K5, K6, K7, K8, K9 and K10 as shown in Figs. 1, 2 and 3. Each of the trigger members T1, T2, T3 and T4 is provided with projecting lug portions MP which engage the under side of their associated vibrating reeds R1, R2, R3 and R4 for preventing the continued vibrations of these reeds when their actuating keys and associated lever members are returned to normal non-operated position, as shown in Figs. 2, 3 and 5, such engagement being effected upon the engagement of the projections P1 of the triggers T1, T2, T3 and T4 with stops afforded at the top end of guiding slots in a plate 66 which also serves as support for the adjustable screw 67.

Each key K1, K2, K3, etc. consists of a cylindrically-shaped button secured at the end of a plunger of rectangular cross-section. These keys are guided in their downward and upward movements by a plate 71 engaging the cylindrically-shaped buttons and a plate 70 engaging the plunger portion of the keys. The plate 71 is held in spaced and oblique relation with respect to plate 70 by a plurality of spacer members 74 shown in Figs. 2, 4 and 5, while the plate 70 is formed integrally with two upright flanges 84 and 85 having portions 86 and 87 for securing the key assembly thus formed on the base plate 20, as by a number of screws 80, 81, 82 and 83, the key members K1, K2, K3, etc., being held in the non-operated position by compression springs 75 shown in Figs. 2, 3 and 5, having one of their ends abutting against the under side of the key buttons and their other ends abutting on the top disposed surface of guiding plate 70.

The lower end portions of the digit keys are disposed in engageable relation with the lever members L1, L2, L3 and L4, for actuating them and the trigger members T1, T2, T3 and T4 carried thereby independently or in combination for actuating the vibrating reeds R1, R2, R3 and R4.

As shown in Fig. 4, keys K1, K2, K3 and K4 operatively engage the lever members L1, L2, L3 and L4 respectively for independently actuating the reeds R1, R2, R3 and R4, the key K5 operatively engages the lever members L1 and L2 for simultaneously vibrating the reeds R1 and R2, the key K6 operatively engages the lever members L2 and L3 for simultaneously vibrating the reeds R2 and R3, the key K7 operatively engages the lever members L3 and L4 for simultaneously vibrating the reeds R3 and R4, the key K8 operatively engages the lever members L1 and L3 for simultaneously vibrating the reeds R1 and R3, the key K9 operatively engages the lever members L2 and L4 for simultaneously vibrating the reeds R2 and R4, and the key K10 operatively engages the lever members L1 and L4 for simultaneously vibrating the reeds R1 and R4.

Although good results have been obtained with reeds R4, R3, R2 and R1, respectively, tuned to vibrate at frequencies of 400, 500, 625 and 780 cycles, other rates of frequencies, especially in the higher ranges, may be used with equally good results.

A mechanism is provided for preventing the accidental operation of more than one of the keys K1, K2, etc., simultaneously. In this mechanism, as shown in Figs. 3, 4, 4A and 5, the plunger portions of keys K1, K2, K3, K4, K5, K6, K7, K8, K9 and K10 are each formed with a perpendicularly extending lug portion Y1, Y2, Y3, Y4, Y5, Y6, Y7, Y8, Y9, and Y10, respectively, provided for individually engaging a row of balls RB in a track 90 secured on the base plate 20 as by screws 91. The track 90 is provided with stops 92 and 93, best seen in Fig. 4A, limiting the length of the track to a distance equal to the sum of the diameter of the balls RB plus a clearance equal to the thickness of one of the lugs Y1, Y2, Y3, etc., between two of the balls RB, as when one of these keys is operated the balls are moved in the race-track in position against each other and against the stops 92 and 93 at the ends of the track for preventing the operation of another key until the previously operated key is released by the operator for permitting it to return to normal unoperated position under the tension of its retractile spring 75.

Figure 8:
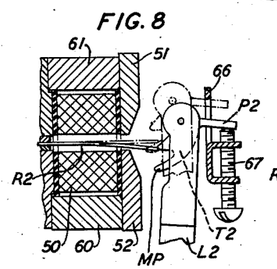
Figs. 8, 9 and 10 are detail views showing one of the reed's actuating mechanism in a number of different positions.
Figure 9:
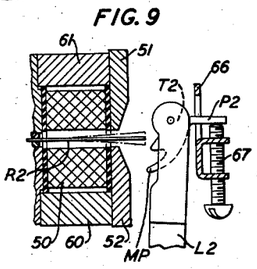
Figure 10:
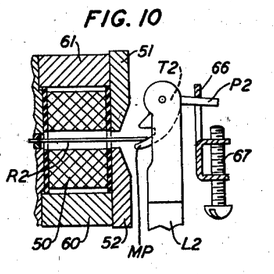

In a typical example of operation, supposing that a telephone call designation such as AB5—6789 is to be transmitted. The key K2 having the character ABC—2 printed thereon is operated against the resistance of its retractile spring 75. The operation of this key is effective to actuate the lever L2 against the resistance of its own retractile spring 27 shown in Figs. 2, 5 and 7, and thereby moving the trigger member T2 from the position shown in dotted lines in Fig. 8 to the position shown in Fig. 9 for flexing the reed R2 to a point wherein the lug P2 of this trigger engages the end of its associated screw 67 to cause the pivotal movement of the trigger T2 for releasing the reed which, due to its resiliency, vibrates at its tuned frequency, that is, 625 cycles in the coil 50 and between the pole-pieces 51 and 52 for generating alternating current of that frequency in the coil and thereby in the telephone line connected thereto. The second operation of key member K2 for signaling the digit B, the operation of reed R2, is, of course, effected in a manner similar to that for signaling the letter A. Upon the release and the subsequent return movement of key K2 and lever L2 to normal position, the trigger T2 is caused to pivot to its normal position due to the lug P2 engaging the abutment afforded at the end of its guiding slot in the plate 66 for reengaging its associated reed R2, as shown in Fig. 10. In that position, however, it is to be noted that the portion MP of the trigger T2 engages the under side of the reed R2 as to prevent the continued vibration of this reed while a succeeding key is being operated.

In the operation of key K5 for signaling the digit 5, the operation of this key is effective to actuate the levers L1 and L2 for simultaneously vibrating the reeds R1 tuned at a frequency of 780 cycles, and reed R2, tuned at a frequency of 625 cycles, thereby differentiating from the signal effected by the operation of key K2.

The operation of key K6 for signaling the digit 6 is effective to actuate the levers L2 and L3 simultaneously and thereby the reeds R2 tuned at a frequency of 625 cycles and reed R3 at a frequency of 500 cycles.

The operation of key K7 is effective to actuate the levers L3 and L4 for simultaneously actuating the reeds R3 tuned as above mentioned to a frequency of 500 cycles, and the reed R4 tuned at a frequency of 400 cycles.

The operation of key K8 is effective to actuate the levers L1 and L3 for simultaneously actuating the reeds R1 tuned at a frequency of 780 cycles, and reed R3 tuned at a frequency of 500 cycles.

The operation of key K9 is effective to simultaneously actuate the levers L2 and L4 for actuating the reeds R2 tuned at a frequency of 625 cycles and the reed R4 tuned at a frequency of 400 cycles, while the operation of key K10 is effective to simultaneously actuate the levers L1 and L4 for vibrating reeds R1 tuned at a frequency of 780 cycles, and R4 tuned at a frequency of 400 cycles, thus differentiating in ten combinations the signals transmitted by the operation of the ten digit keys K1, K2, K3, etc.

Figure 6A:
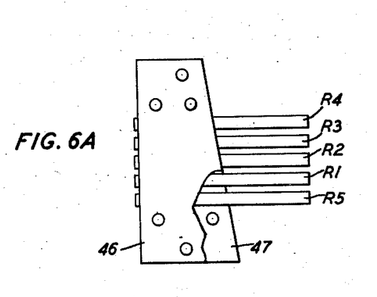
Figure 7:
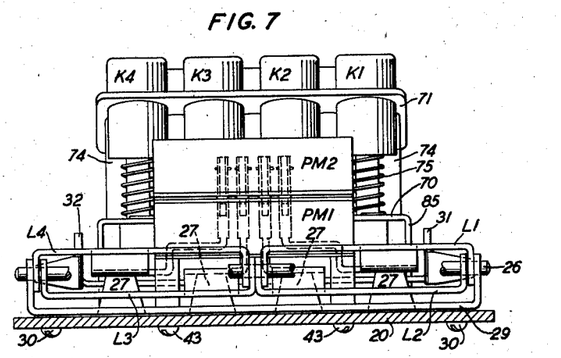
Fig. 7 is a rear view showing the lever members pivoted on their supporting shaft, this shaft being shown with portions cut away and the supporting plate in section taken on line 7—7 of Fig. 4.
Figure 11:
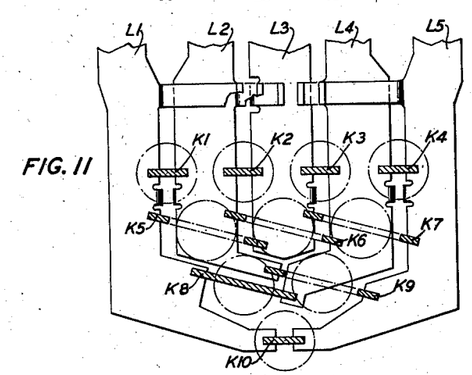
Fig. 11 is a partial view of the lever members showing the plunger portion of the keys in section taken on line 11—11 of Fig. 3.

In a modification of the reed operating mechanism as shown in Fig. 11, five levers L1, L2, L3, L4 and L5 are operated by the ten digit keys K1, K2, K3, K4 and K5 for actuating five vibrating reeds shown in Fig. 6A through the operation of a corresponding number of trigger members in the manner described in connection with reeds R1, R2, R3 and R4 of Figs. 4 and 6. In this modification, however, the reed R5 is tuned to vibrate at a frequency of 975 cycles and the levers L1, L2, L3, L4 and L5, and thereby their associated vibrating reeds, are operated in ten combinations of two reeds upon the operation of the key members K1, K2, K3 and K4, etc. According to this mechanism, as shown in Fig. 11, key K1 operates levers L1 and L2 and thereby reeds R5 and R1; key K2 operates levers L2 and L3 and thereby the reeds R1 and R2; key K3 operates levers L3 and L4 and thereby the reeds R2 and R3; key K4 operates levers L4 and L5 and thereby reeds R3 and R4; key K5 operates levers L1 and L3 and thereby the reeds R5 and R2; key K6 operates levers L2 and L4 and thereby reeds R1 and R3; key K7 operates levers L3 and L5 and thereby reeds R2 and R4; key K8 operates levers L1 and L4 and thereby reeds R5 and R3; key K9 operates levers L2 and L5 and thereby reeds R1 and R4; and key K10 operates levers L1 and L5 and thereby reeds R5 and R4.

The principal advantage in the use of five reeds in combination of two lies in the fact that provision at the exchange is easily made for routing all signals in which one of the reeds fails to operate to an operator instead of making a wrong telephone connection.

In another modification of the reed operating mechanism shown in Figs. 12, 13, 14, 15, 16, 17 and 18, the shaft 26 pivotally supports a plurality of U-shaped yokes 101, 102, 103, 104 and 105, the arms 106 and 107 of a cross-bar 108 and the lever portions of keys K1, K2, K3, K4, K5, K6, K7, K8, K9 and K10. The lever portions of keys K1, K2, etc. extend is superposed relation with respect to the U-shaped yokes 101, 102, 103, etc., and each yoke 101, 102, 103, etc. carries an arm 101X, 102X, 104X and 105X, respectively, provided for pivotally mounting the trigger members T1Y, T2Y, T3Y, T4Y and T5Y, in engageable relation with the vibrating reeds R1Y, R2Y, R3Y, R4Y, and R5Y tuned as stated in connection with the reeds shown in Fig. 6A for vibrating at the frequencies of 975 cycles, 780 cycles, 625 cycles, 500 cycles and 400 cycles, respectively, upon the operation of the keys K11, K12, K13, etc., in a manner that will be hereinafter described in detail.

Figure 15:
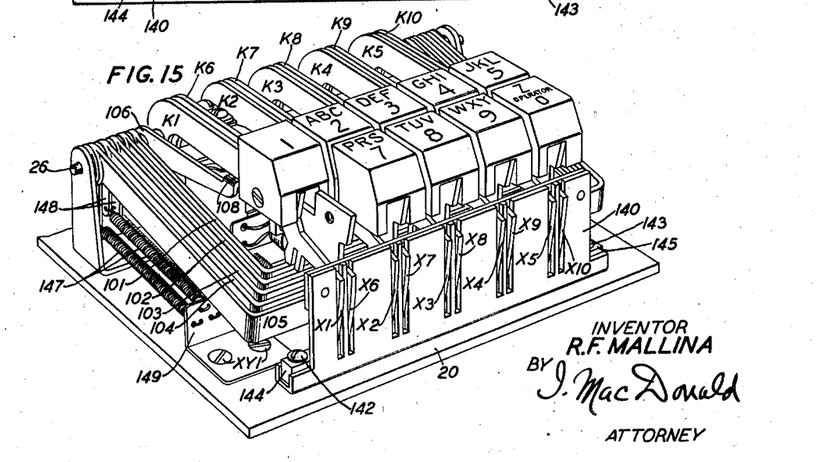
Fig. 15 is a perspective view of the digit key assembly.
Figure 16:
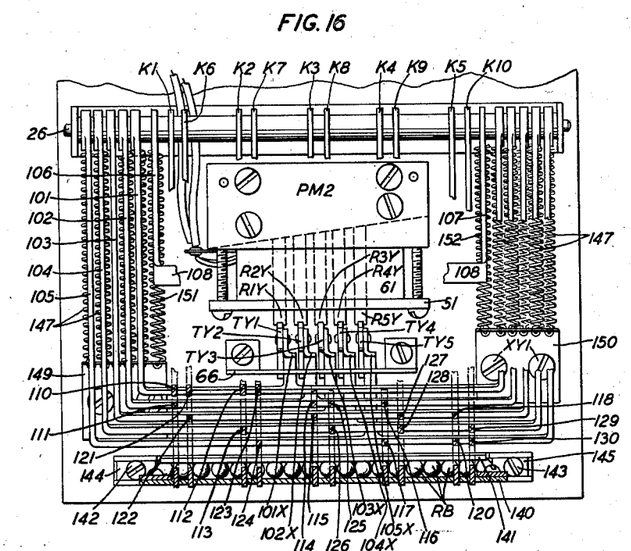
Fig. 16 is a partial top view of the reeds actuating mechanism showing a number of operating parts in section.
Figure 17:
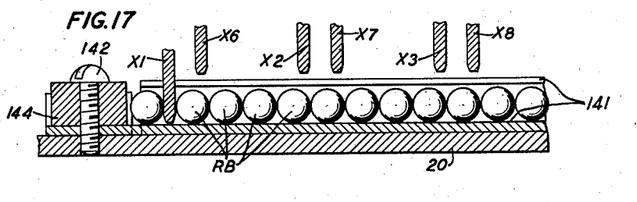
Fig. 17 is a partial view of a modification of the mechanism for preventing the operation of two digit keys simultaneously.
Figure 18:
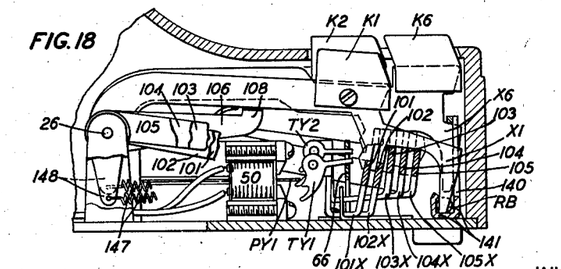
Fig. 18 is a partial side view showing one of the key members in the operated position.

The lever portions of keys K1, K2, K3, etc., are provided with downwardly projecting lugs shown in Figs. 13, 15, 18 and in section in Fig. 16 disposed in operative relation with the U-shaped yokes 101, 102, 103, 104 and 105 for operating them in pairs. Key K1, as shown in Fig. 16, is provided with lugs 110 and 111 engaging the yokes 101 and 102 for actuating the trigger members TY1 and TY2 for operating the reeds R1Y and R2Y. Key K2 is provided with lugs 112 and 113 for actuating the yokes 101 and 104 for operating the trigger members TY1 and TY4 for operating the reeds R1Y and R4Y. Key K3 is provided with lugs 114 and 115 for actuating the yokes 102 and 103 for operating the trigger members TY2 and TY3 for operating the reeds R2Y and R3Y. Key K4 is provided with lugs 116 and 117 for actuating the yokes 102 and 105 for actuating the trigger members TY2 and TY5 for operating the reeds R2Y and R5Y. Key K5 is provided with lugs 118 and 120 for actuating the yokes 103 and 105 and thereby the trigger members TY3 and TY5 for operating the reeds R3Y and R5Y. Key K6 is provided with lugs 121 and 122 for actuating the yokes 101 and 103 for operating the trigger members TY1 and TY3 for actuating the reeds R1Y and R3Y. Key K7 is provided with lugs 123 and 124 for actuating the yokes 101 and 105 and thereby the trigger members TY1 and TY5 for actuating the reeds R1Y and R5Y. Key K8 is provided with lugs 125 and 126 for actuating the yokes 104 and 102 and thereby the trigger members TY1 and TY2 for actuating the reeds R2Y and R4Y. Key K9 is provided with lugs 127 and 128 for actuating the yokes 103 and 104 and thereby the trigger members TY3 and TY4 for actuating the reeds R3Y and R4Y. Key K10 is provided with lugs 129 and 130 for actuating the yokes 104 and 105 and thereby the trigger members TY4 and TY5 for actuating the reeds R4Y and R5Y, thus differentiating the operation of the keys K1, K2, K3, etc., into ten combinations of two frequencies each.

The lever portions of key members K1, K2, K3, etc. are each provided at their free ends with downwardly extending lugs X1, X2, X3, X4, X5, X6, X7, X8, X9 and X10, shown in Figs. 13, 15, 16, 17 and 18, each movable in a respective slot in a guiding plate 140 for individually engaging a row of balls RB in a track 141 formed at the lower end portion of guiding plate 140 as shown in Fig. 13, this plate being secured at both ends to the base plate 20 by screws 142 and 143.

The track 141 is provided with stop elements 144 and 145 limiting the length of the track to a distance equal to the sum of the diameter of balls RB plus a clearance equal to the thickness of one of the lugs X1, X2, X3, etc., so that upon the engagement of one of these lugs between two of the balls as when one of the keys is operated, the balls are moved in the race-track in position close to each other for preventing the operation of another key until the previously operated key is returned to normal unoperated position. In this modification, the return movement of each key member K1, K2, K3, etc., is effected through the return movement of the U-shaped yokes 101, 102, 103, 104 and 105, by the tension of the helical springs 147 shown in Figs. 13, 14, 15, 16 and 18, hooked at one of their ends to downwardly extending pair of arms 148 formed with the U-shaped yokes 101, 102, 103, etc., adjacent their bearing portions while the other ends of these springs are hooked to the upright extending portions of two right-angled strips 149 and 150 secured to the base plate 20 by screws XY1 shown in Figs. 14, 15 and 16.

Similarly the bar 108 which is formed with the pivoted arms 106 and 107 is held in engaged relation with the under side of the lever portions of keys K1, K2, K3, etc., by two retractile springs 151 and 152 having similar ends hooked to downwardly extending lugs formed with the arms 106 and 107 of this bar and their other ends to the angle pieces 149 and 150, respectively.

The movement of bar 108 upon the operation of any one of the keys is effective to operate the switch springs 35, 36, 37, 38, 39 and 40 in the manner described in connection with the call transmitter shown in Figs. 1 and 2.

What is claimed is:

1. In a call transmitter, a base, a shaft, means carried by said base for supporting said shaft, a plurality of digit key members and U-shaped yokes pivoted on said shaft, said yokes being disposed for operation in pairs by the movement of said key members, a plurality of reeds, a trigger member carried by each of said yokes disposed in engageable relation with the corresponding one of said reeds and means for translating the operation of said reeds for transmitting telephone call designations corresponding to the operation of said digit key members.

2. In a call transmitter, a base, a bracket carried by said base, a shaft supported by said bracket, a set of key members pivotally mounted on said shaft, a plurality of U-shaped yokes having parallel arms pivoted on said shaft on each side of said set of key members with the cross-bar portions of said yokes disposed for operation in pair combinations by the operation of each of said key members, a projection carried by each of said levers, a pawl pivoted on each of said projections, a reed vibrated by the operation of each of said pawls upon the operation of said key members in said combinations, a stop element carried by said base for disengaging said pawls from said reeds upon a predetermined movement of said key members, means carried by each of said pawls for arresting the vibration of said reeds upon the return movement of said keys to normal, and means for translating the operation of said reeds into telephone call designations.

3. In a call transmitter, a base, a set of pivoted digit key members, a set of pivoted U-shaped yokes having their cross-bar portions disposed in engageable relation with said key members, a common supporting shaft for said yokes and said key members, a permanent magnet formed of two parts, metallic plates disposed between said parts and reeds adjusted to different frequencies clamped between said plates, trigger members carried by said yokes for vibrating said reeds upon the operation of said key members, and a device responsive to the operation of said reeds for transmitting telephone call designations corresponding to the operation of said digit key members.

RUDOLPH F. MALLINA.